United States Patent [19]

Amano

[11] Patent Number: 5,265,115
[45] Date of Patent: Nov. 23, 1993

[54] SOLID-STATE LASER DEVICE HAVING A FEEDBACK LOOP

[75] Inventor: Sho Amano, Tokyo, Japan

[73] Assignee: Hoya Corporation, Tokyo, Japan

[21] Appl. No.: 936,044

[22] Filed: Aug. 26, 1992

[30] Foreign Application Priority Data

Aug. 30, 1991 [JP] Japan .................................. 3-219637

[51] Int. Cl.[5] ............................................. H01S 3/091
[52] U.S. Cl. ........................................ 372/75; 372/69; 372/70; 372/71; 372/34; 372/36
[58] Field of Search ................. 372/75, 71, 70, 69, 372/34, 36

[56] References Cited

U.S. PATENT DOCUMENTS

| 4,809,291 | 2/1989 | Byer et al. | 372/75 |
| 4,974,230 | 11/1990 | Henmati | 372/71 |
| 5,168,503 | 12/1992 | Maeda | 372/34 |
| 5,181,214 | 1/1993 | Berger et al. | 372/34 |

FOREIGN PATENT DOCUMENTS

| 0084480 | 3/1992 | Japan | 372/75 |
| 0134326 | 5/1992 | Japan | 372/36 |

Primary Examiner—Georgia Y. Epps
Attorney, Agent, or Firm—Ladas & Parry

[57] ABSTRACT

In a solid-state laser device which pumps a solid-state laser medium in a laser resonator by an excitation laser beam generated from a semiconductor laser unit and which emits an output laser beam, a photo detector detects intensity of the output laser beam to produce a photo detection signal which corresponds to the intensity of the output laser beam and which is sent to a controller. The controller controls the semiconductor laser unit in response to the photo detection signal and adjusts intensity of the excitation laser beam to keep the intensity of the output laser beam substantially constant. The solid-state laser medium may be pumped from an end surface or a side surface. An optical function element, such as a wavelength conversion element, a Q switch element, may be located outside or inside of the laser resonator.

9 Claims, 4 Drawing Sheets

SOLID-STATE LASER DEVICE HAVING A FEEDBACK LOOP

BACKGROUND OF THE INVENTION

This invention relates to a solid-state laser device for use in emitting an output laser beam by pumping a solid-state laser medium by a semiconductor laser unit.

In a conventional solid-state laser device of the type described, a solid-state laser medium, such as Nd:YAG, is arranged in a laser resonator and pumped by an excitation laser beam to oscillate an output laser beam. Specifically, the solid-state laser medium has a pair of end surfaces and a side surface contiguous to the end surfaces and emits an oscillation laser beam along an optical axis extended through the end surfaces when the solid-state laser medium is excited by the excitation laser beam. The oscillation laser beam is generated as the output laser beam through the laser resonator. Herein, it is to be noted here that the excitation laser beam is usually generated by a semiconductor laser diode and is given to the solid-state laser medium and is irradiated onto either at least one of the end surfaces of the solid-state laser medium or the side surface of the solid-state laser medium.

In addition, it often happens that a wavelength conversion element, such as KTP, is located inside or outside of the laser resonator so as to emit the output laser beam which has a wavelength different from that of the oscillation laser beam. This structure enables oscillation of a blue or a green laser beam. Herein, such a wavelength conversion element will be generally called an optical function element.

At any rate, the solid-state laser medium and the wavelength conversion element are subjected to thermal control to stably oscillate the output laser beam. This means that the output laser beam should be invariable in intensity.

In the meantime, it is a recent trend that such a solid-state laser device is applicable to a wide variety of equipments and that a strict limitation is very often imposed on intensity of the output laser beam. In this connection, the intensity of the output laser beam should be always strictly stabilized for a whole duration of an operation of the solid-state laser device.

However, it has been found out that the above-mentioned thermal control can respond neither to a quick change of an atmospheric temperature nor to a temperature change which transiently occurs for a warm-up duration immediately after the operation is started in the solid-state laser device. In other words, such a quick change of the temperature brings not only about variations of characteristics of the solid-state laser medium and the optical function element but also about a relative relationship of positions between the solid-state laser medium and the optical function element. In addition, the quick change of the temperature results in a change of an oscillation condition of the laser resonator also. Thus, the intensity of the output laser beam inevitably fluctuates due to a vibration and/or aging of the solid-state laser device.

SUMMARY OF THE INVENTION

It is an object of this invention to provide a solid-state laser device which is capable of accurately responding to a quick or a transient temperature change appearing for a warm-up duration or on a start operation of the solid-state laser device.

It is another object of this invention to provide a solid-state laser device of the type described, which can always keep intensity of an output laser beam substantially invariable regardless of an oscillation condition.

A solid-state laser device to which this invention is for use in emitting an output laser beam by pumping a solid-state laser medium in a laser resonator by an excitation laser beam generated from a semiconductor laser unit.

According to an aspect of this invention, the solid-state laser device comprises photo detection means for detecting intensity of the output laser beam to produce a photo detection signal representative of the intensity of the output laser beam and control means coupled to the photo detection means for controlling the excitation laser beam so that the output laser beam becomes substantially invariable in intensity.

According to another aspect of this invention, the photo detection means is united with the semiconductor laser unit. The control means may supply the photo detection signal to the semiconductor laser unit.

DESCRIPTION OF THE PREFERRED EMBODIMENTS

Figure 1:
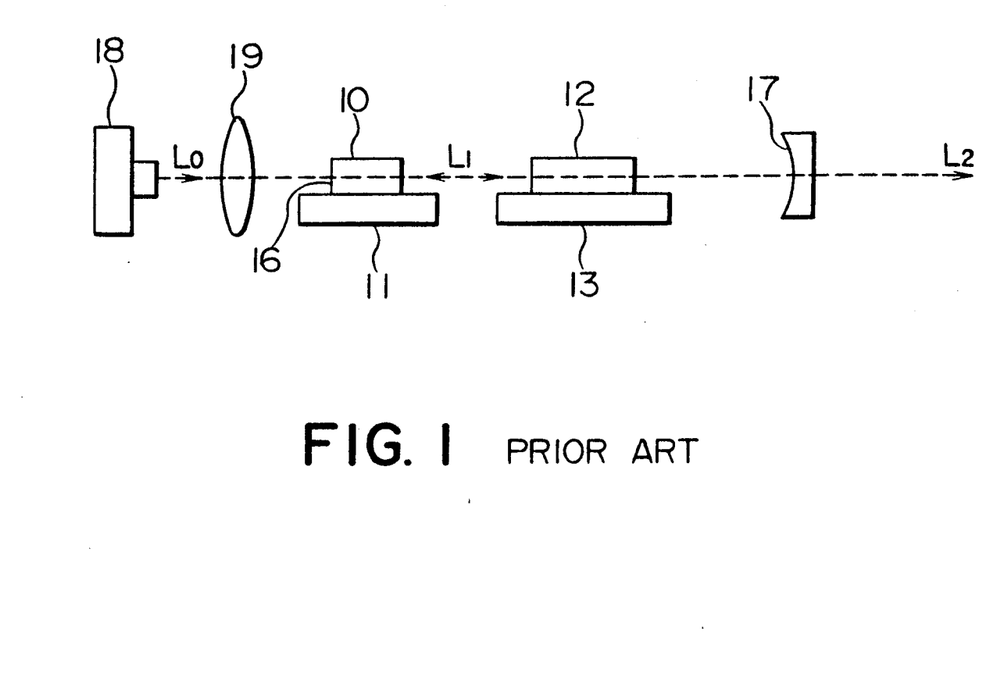
FIG. 1 shows a side view of a conventional solid-state laser device.

Referring to FIG. 1, a conventional solid-state laser device is substantially equivalent to that disclosed in U.S. Pat. No. 4,809,291. The illustrated solid-state laser device comprises a solid-state laser medium 10 of a rod shape which has first and second end surfaces directed leftwards and rightwards of FIG. 1, respectively, and a side surface contiguous to the first and the second end surfaces. The solid-state laser medium 10 is mounted or supported on a thermal controller 11' formed, for example, by a Peltier effect element and generates an oscillation laser beam L1 along an optical axis extended through both the first and the second end surfaces when excited by an excitation laser beam L0 in a manner to be described later. In the example being illustrated, a wavelength conversion element 12 is arranged along the optical axis and is mounted on a heater 13. The wavelength conversion element 12 is operable to partially shorten a wavelength of the oscillation laser beam by half and to produce a converted laser beam which has, together with a non-converted laser beam, a wavelength equal to a half of the wavelength of the oscillation laser beam L1.

Both the solid-state laser medium 10 and the wavelength conversion element 12 is located within a laser resonator which is structured by first and second mirrors 16 and 17. The first mirror 16 is attached on the first end surface of the solid-state laser medium 10 while the second mirror 17 is located along the optical axis on the righthand side of the wavelength conversion element 12 in FIG. 1. The first mirror 16 has an optical characteristic such that the oscillation laser beam L1 is reflected thereon and the excitation laser beam L0 is almost transmitted therethrough. Such a first mirror can be formed by a dielectric multi-layer composed of a plurality of dielectric films, as well known in the art. On the other hand, the converted laser beam L1 is almost transmitted by the second mirror 17 as an output laser beam L2.

On the lefthand side of the solid-state laser medium 10 in FIG. 1, a semiconductor laser unit 18 is located so as to generate the excitation laser beam L0 and to excite the solid-state laser medium 10 through an optical system 19 specified by a condenser lens in FIG. 1.

In FIG. 1, the excitation laser beam L0 is generated by the semiconductor laser unit 18 and is irradiated onto the first end surface of the solid-state laser medium 10 through the condenser lens 19 and the first mirror 16. Inasmuch as the excitation laser beam L0 is transmitted through the first mirror 16, as mentioned before, the solid-state laser medium 10 is pumped by the excitation laser beam L0 to emit the oscillation laser beam L1 along the optical axis. The oscillation laser beam L1 is sent to the wavelength conversion element 12 to be partially converted into the converted laser beam. The oscillation laser beam 11 which is called a non-converted laser beam is reflected on the second mirror 17 to be sent back towards the first mirror 16 and is reflected by the first mirror 16 again. On the other hand, the converted laser beam is almost transmitted through the second mirror 17. This means that the optical characteristic of the first mirror 16 is selected so that the converted laser beam can be reflected in addition to the oscillation laser beam L1. The oscillation laser beam L1 is augmented between the first and the second mirrors 16 and 17 by repeating reflections to be sent through the second mirror 17 while the converted laser beam is transmitted through the second mirror 17 as the output laser beam L2.

With this structure, the semiconductor laser unit 18 is controlled so that the excitation laser beam L0 becomes invariable in intensity. However, the illustrated solid-state laser device has disadvantages as mentioned in the preamble of the instant specification.

Figure 2:
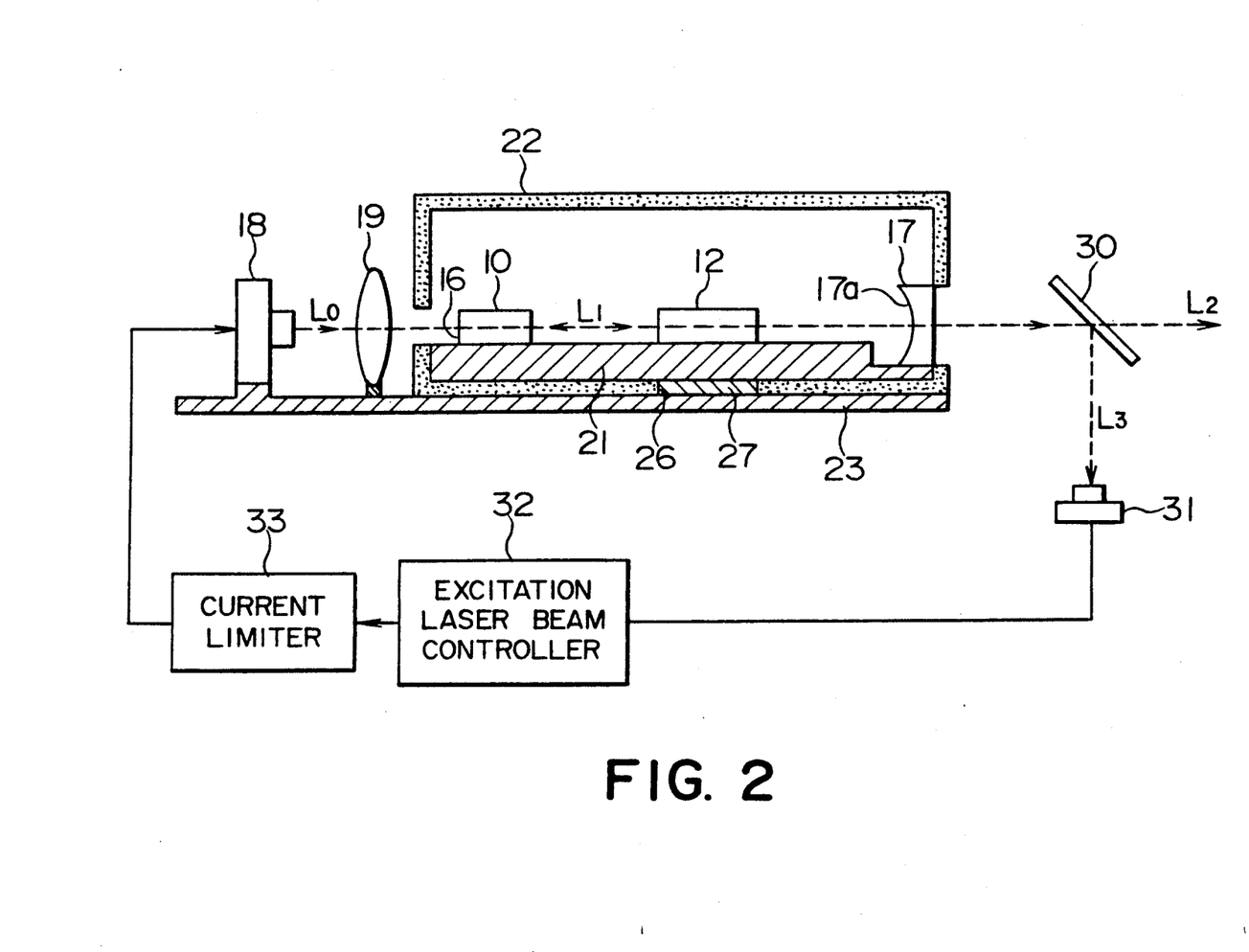
FIG. 2 shows a sectional view of a solid-state laser device according to a first embodiment of this invention with a part illustrated in blocks.

Referring to FIG. 2, a solid-state laser device according to a first embodiment of this invention comprises similar parts designated by like reference numerals and symbols. In FIG. 2, the solid-state laser medium 10 and the laser resonator are mounted on a thermal conductive support 21 together with an optical function element 12 and are accommodated in an adiabatic housing 22 fixed on a heat sink 23. The adiabatic package 22 has an inlet window and an outlet window both of which are opened along the optical axis. In the example being illustrated, the optical function element 12 may be a wavelength conversion element of KTP, like in FIG. 1.

In addition, an opening 26 is formed on a bottom surface of the adiabatic housing 22. A thermal control block 27, such as a Peltier effect element block, is packed into the opening 26 and is brought into contact with both the thermal conductive support 21 and the heat sink 23 to radiate heat through the heat sink 23. The thermal control block 27 is driven by a control circuit (not shown) to be kept at a predetermined temperature. Consequently, both the solid-state laser medium 10 and the wavelength conversion element 12 are kept at the predetermined temperature.

Herein, it is assumed that the solid-state laser medium 10 is composed of a laser rod of Nd:YAG having a diameter of 3 millimeters, a length of 5 millimeters, and the first and the second end surfaces subjected to a mirror finish. In addition, the solid-state laser medium 10 is also assumed to oscillate an oscillation laser beam L1 having a wavelength of 1064 nm and to have a light absorption peak wavelength of 807 nm. In this connection, the illustrated solid-state laser medium 10 is pumped by the oscillation laser beam L0 of 807 nm while the wavelength conversion element 12 serves to convert the wavelength of the oscillation laser beam L1 into a wavelength of a converted laser beam which is equal to 532 nm.

Like in FIG. 1, the laser resonator is formed by the first mirror 16 attached to the first end surface of the solid-state laser medium 10 and the second mirror 17 placed on the righthand side of the wavelength conversion element 12. The first mirror 16 is formed by a dielectric multi-layer composed of a plurality of dielectric films which are successively deposited on the first end surface of the solid-state laser medium 10 by evaporation or sputtering. The first mirror 16 exhibits a reflectance of 99.9% for the oscillation laser beam L1 of 1064 nm and a transmittance higher than 85% for the excitation laser beam L0 of 807 nm.

On the second end surface of the solid-state laser medium 10, an antireflection layer (not shown) is deposited to prevent reflection of the oscillation laser beam L1 on the second end surface. Specifically, the antireflection layer exhibits a reflectance which is not higher than 0.5%, for the oscillation laser beam L1.

In the illustrated laser resonator, the second mirror 17 is adjacent to the outlet window and is composed of a concave lens having a concave surface directed to the solid-state laser medium 10 and dielectric multi-layer 17a coated on the concave surface. Specifically, the dielectric multi-layer 17a has a transmittance of 90% for the converted laser beam or the output laser beam L2 while the concave surface of the concave lens has a radius of curvature of 50 millimeters. The dielectric multi-layer 17a is spaced from the first mirror 16 by 20 millimeters.

In FIG. 2, the thermal conductive support 21 may be a plate of a thermal conductive material of, for example, copper, brass, iron, stainless, aluminum, Invar, or the like while the heat sink 23 may be also formed by a thermal conductive material of, for example, copper, brass, iron, stainless, aluminum, Invar, or the like.

Furthermore, the semiconductor laser unit 18 and the condenser lens 19 are mounted on the heat sink 21 and are arranged along the optical axis of the oscillation laser beam L1. It is surmised that the semiconductor laser unit 18 comprises a semiconductor laser diode of a gallium arsenide (GaAs) compound which can generate an excitation laser beam of a wavelength between 800 and 820 nm. The semiconductor laser diode is supplied with a drive current and emits the excitation laser beam L0 which has intensity in dependency upon an amplitude of the drive current. In addition, a thermal controller (not shown) is included in the semiconductor laser unit 18 so as to adjust the excitation laser beam to the light absorption peak wavelength of 807 nm in the solid-state laser medium 10, as mentioned before. In other words, the semiconductor laser diode is kept at a temperature of 25° C. by the thermal controller so as to generate the excitation laser beam of 807 nm Further referring to FIG. 2, the converted laser beam is allowed to pass through the second mirror 17 and is incident onto a beam splitter 30 located along the optical axis of the oscillation laser beam L1 outside of the adiabatic housing 22 to be split into an output laser beam L2 and a detection or monitoring laser beam L3 both of which have the same wavelength. The illustrated beam splitter 30 is formed by a glass substrate of ten millimeter square and a dielectric multi-layer coated on the glass substrate and is inclined at an angle of 45 relative to the optical axis of the oscillation laser beam L1 and the converted laser beam. At any rate, the monitoring laser beam L3 as intensity proportional to that of the output laser beam L2 and is sent to a photo detector 31.

The photo detector 31 may comprise a photo detection element, such as a silicon diode, a germanium diode, or the like, which produces a photo detection signal corresponding to intensity of the monitoring laser beam L3. This shows that the photo detection signal is representative of intensity of the output laser beam L2. The photo detection signal is delivered to an excitation laser beam controller 32 which is coupled to the semiconductor laser unit 18 through a current limiter 33. The excitation laser beam controller 32 supplies the semiconductor laser unit 18 with a control signal as the drive current which has the amplitude dependent on an amplitude of the photo detection signal. From this fact, it is readily understood that feedback control is carried out in the illustrated solid-state laser device to control the intensity of the excitation laser beam L0. The illustrated semiconductor laser unit 18 generates the excitation laser beam L0 of 0.45 watt when the drive current of 0.8 ampere is given thereto.

Inasmuch as the intensity of the output laser beam L2 is dependent on that of the excitation laser beam L0, it is possible to always keep the intensity of the output laser beam L2 substantially constant by controlling the intensity of the excitation laser beam L0, regardless of a variation of oscillation conditions. Taking this into consideration, the control signal is sent in the form of the drive current to the semiconductor laser diode of the semiconductor laser unit 18 to control the intensity of the excitation laser beam L0. The current limiter 33 illustrated in FIG. 2 limits the amplitude of the control signal so that the amplitude of the control signal does not exceed a maximum rated drive current. Thus, the current limiter serves not only to prevent the feedback control from being put into a disordered or an uncontrolled state but also to avoid a breakage of the semiconductor laser unit 18 due to an excessive amount of current. The illustrated limiter 33 is set into a maximum current of 0.9 ampere.

Moreover, the condenser lens 19 between the semiconductor laser unit 18 and the solid-state laser medium 10 acts to collect or converge the excitation laser beam L0 onto the first end surface of the solid-state laser medium 10 through the first mirror 16 and to pump the solid-state laser medium 10. In the illustrated example, a degree of convergence of the excitation laser beam L0 is set so that a mode volume of the excitation laser beam L0 is coincident with a mode volume of the oscillation laser beam L1.

In FIG. 2, let laser oscillation be started by energizing the semiconductor laser unit 18 to obtain the output laser beam L2 which has an oscillation output of 20 milliwatts. In this event, an output stability has been measured about the output laser beam L2. As a result of the measurement, it has been found out that the output laser beam L2 is very stable in intensity immediately after the laser oscillation is started. This dispenses with warm-up operation. Likewise, even when an ambient temperature is drastically changed, the intensity of the output laser beam L3 has been kept substantially constant. Specifically, a short-term stability within one second and a long-term stability between one second and one hour has been estimated by a coefficient of fluctuation. Consequently, it has been confirmed that the coefficient of fluctuation has fallen within a range of 2%. This shows that both the short-term stability and the long-term stability are excellent in the illustrated solid-state laser device. In addition, such a stability has been continuously kept for a running test over 1000 hours.

In the above-mentioned example, the wavelength conversion element of KTP is used as the optical function element 12. However, a Q switch element may be substituted as the optical function element 12 for the wavelength conversion element. The Q switch element may be, for example, an AO Q switch element composed of tellurite glass. In this event, Q switching operation is carried out in the acousto-optic (AO) Q switch element at a pulse repetition frequency of 1 KHz to obtain the output laser beam L3 which has an average output of 20 milliwatts, a pulse width of 30 ns, and pulse energy of 20 micro joules.

Figure 3:
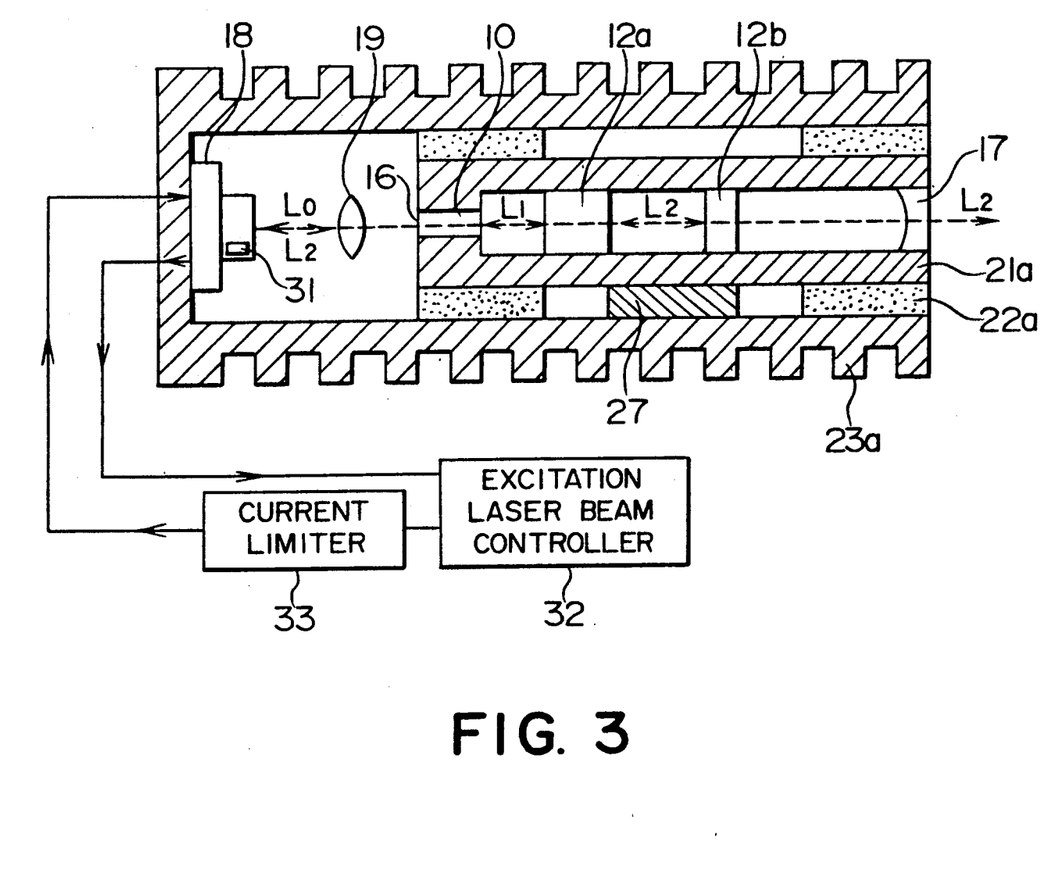
FIG. 3 shows a sectional view of a solid-state laser device according to a second embodiment of this invention.

Referring to FIG. 3, a solid-state laser device according to a second embodiment of this invention comprises similar parts designated by like reference numerals and symbols. At first, the illustrated solid-state laser device is useful for oscillating an output laser beam L2 of green having a wavelength of 532 nm.

In the illustrated example, the thermal conductive support is formed by a cylindrical body 21a which has a cylinder axis extended along an optical axis of the solid-state laser medium 10, a first end forming a window, and a second end opened and which is formed by copper, brass, iron, stainless, aluminum, Invar, or the like. The solid-state laser medium 10 is formed by Nd:YAG and is fitted in the window of the first end of the cylindrical body 21a with the first and the second end surfaces of the solid-state laser medium 10 directed leftwards and rightwards of FIG. 3, respectively. The first mirror 16 of the dielectric multi-layer is deposited on the first end surface of the solid-state laser medium 10. On the other hand, the second mirror 17 is fitted to the second end opened and has the concave lens and the dielectric multi-layer 17a coated on the concave surface of the concave lens.

A heat sink 23a surrounds a hollow space therein and has a plurality of fins on an outside surface thereof to radiate heat. The cylindrical body 21a is housed in the hollow space of the heat sink 23a with annular adiabatic spacers 22a and a thermal controller 27 interposed between the cylindrical body 21a and the heat sink 23a. In addition, the semiconductor laser unit 18 and the condenser lens 19 are also housed in the hollow space of the heat sink 23a. The semiconductor laser unit 18 and the condenser lens 19 are mounted on an inner surface of the heat sink 23a so that an optical axis of each of the semiconductor laser unit 18 and the condenser lens 19 is coincident with an optical axis of the solid-state laser medium 10.

In FIG. 3, the optical functional element is constituted by first and second elements which are depicted at 12a and 12b, respectively, and which are assumed to be a wavelength conversion element of KTP and a quarter wavelength plate, respectively, although an etalon may be included in such an optical functional element. The wavelength conversion element 12a and the quarter wavelength plate 12b are arranged so that both of optical axes are coincident with the optical axis of the solid-state laser medium 10. In other words, the illustrated optical elements have a common optical axis.

Herein, it is to be noted here that the solid-state laser medium 10 generates the oscillation laser beam L1 of a fundamental wavelength (1064 nm). The wavelength conversion element 12a is operable to convert the oscillation laser beam L1 of the fundamental wavelength into a converted laser beam of a secondary harmonic wavelength (532 nm) while the quarter wavelength plate 12b serves to remove noise from the converted laser beam and to obtain a noise-free converted laser beam which is produced through the second mirror 17 as the output laser beam L2.

In the example being illustrated, the semiconductor laser unit 18 comprises a transmission section, a reception section, and a thermal controller. The transmission section includes a semiconductor laser diode while the reception section includes a silicon photo diode operable as the photo detector depicted at 31 in FIG. 3. The semiconductor laser diode oscillates an excitation laser beam L0 which has a wavelength of 807 nm when a drive current is caused to flow through the semiconductor laser diode. The reception section is coated with a wavelength selection layer which transmits only the converted laser beam L2 by 90%. In other words, the wavelength selection layer has a transmittance not lower than 90% for the converted laser beam.

Like in FIG. 2, the second mirror 17 acts as the laser resonator in combination with the first mirror 16 and has a high reflectance which is not smaller than 99.9% for the fundamental wavelength of 1064 nm and a transmittance of 90% for the converted laser beam of the secondary harmonic wavelength. In addition, the radius of curvature of the second mirror 17 and the length of the laser resonator are equal to those illustrated with reference to FIG. 2.

With this structure, the solid-state laser medium 10 is pumped by the excitation laser beam L0 to emit the oscillation laser beam L1. The oscillation laser beam L1 is converted into the converted laser beam L2 by the wavelength conversion element 12a and the quarter wavelength plate 12b. The oscillation laser beam L1 is repeatedly reflected between the first and the second mirrors 16 and 17 while the converted laser beam L2 is transmitted through the second mirror 16 to be generated as the output laser beam. Likewise, the converted laser beam L2 is allowed to pass through the first mirror 16 to be sent to the semiconductor laser unit 18 through the condenser lens 19 and to be received by the photo detector 31 in the semiconductor laser unit 18. The photo detector 31 supplies the excitation laser beam controller 32 with the photo detection signal corresponding to intensity of the converted laser beam L2. This means that the photo detection signal is representative of intensity of the output laser beam because the converted laser beam L2 is generated as the output laser beam, as readily understood from FIG. 3. Thus, the illustrated photo detector 31 detects or monitors a return laser beam resulting from the converted laser beam L2.

Supplied with the photo detection signal from the semiconductor laser unit 18, the excitation laser beam controller 32 produces the control signal which has an amplitude determined by an amplitude of the photo detection signal and which is delivered to the semiconductor laser diode as the drive signal through the current limiter 33. Thus, the semiconductor laser diode is driven by the drive signal to cause an electric current to flow. As a result, the semiconductor laser diode emits the excitation laser beam having the intensity determined by the drive signal.

When a laser oscillation experiment has been made by the use of the above-mentioned solid-state laser device, it has been confirmed that a stable green laser beam is generated as the output laser beam and that the stability is similar to that illustrated in conjunction with FIG. 2.

Figures 4, 5:
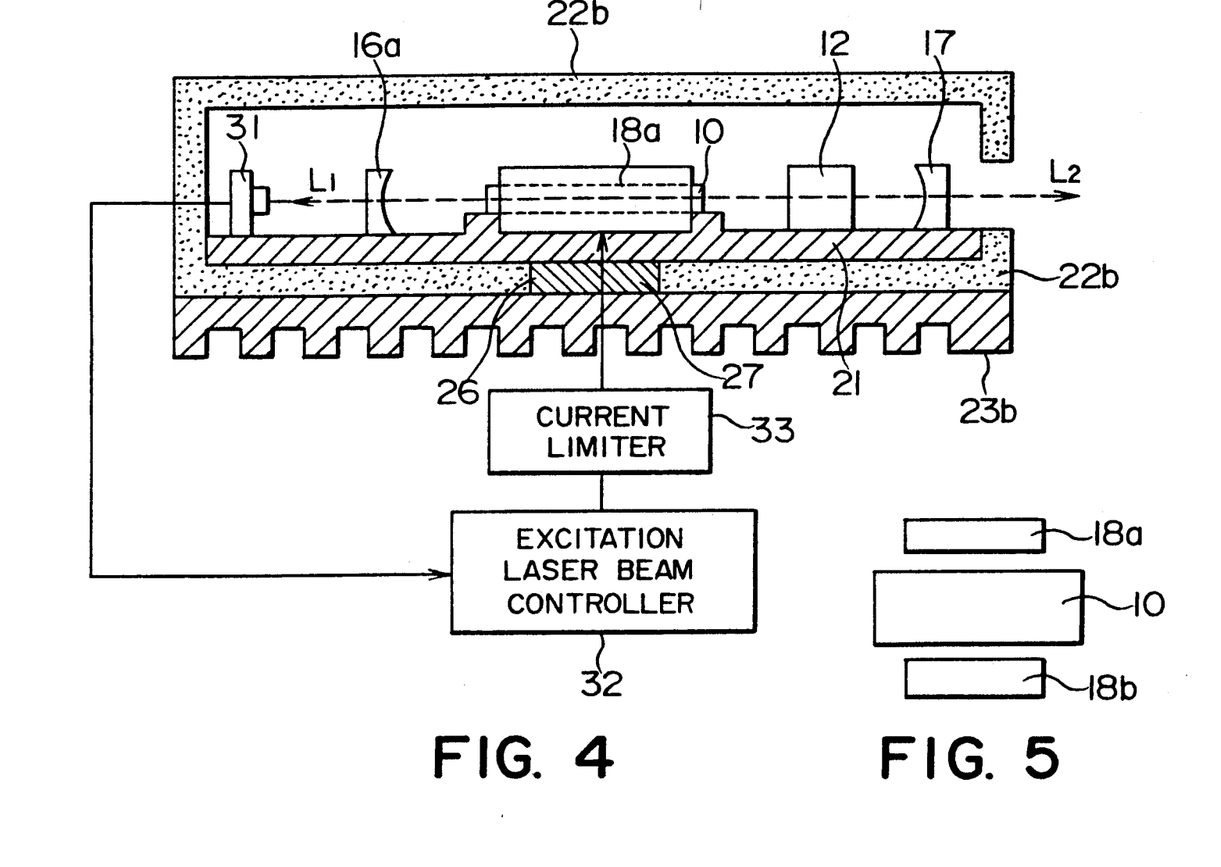
FIG. 4 shows a sectional view of a solid-state laser device according to a third embodiment of this invention.
FIG. 5 is a plan view of a part of the solid-state laser devices illustrated in FIG. 4.

Referring to FIG. 4 together with FIG. 5, a solid-state laser device according to a third embodiment of this invention comprises similar parts designated by like reference numerals and symbols. In FIGS. 4 and 5, it is to be noted that the solid-state laser medium 10 of rod shape is interposed between a pair of semiconductor laser units 18a and 18b, as best shown in FIG. 5.

Specifically, the solid-state laser medium 10 has first and second end surfaces directed to a lefthand side a righthand side of FIGS. 4 and 5, respectively, a side surface contiguous to the first and the second end surfaces, and an optical axis extended through the first and the second end surfaces. From this fact, it is readily understood that the illustrated solid-state laser medium 10 is pumped from the side surface by the semiconductor laser units 18a and 18b and that this device may be called a side pumping device. The illustrated solid-state laser medium 10 is formed by a laser rod of Nd:YAG which has a diameter of 2 millimeters and a length of 15 millimeters. Both the end surfaces are subjected to a mirror finish like in FIGS. 2 and 3 and are parallel to each other. Antireflection layers are coated on the end surfaces of the solid-state laser medium 10 so that less than 0.5% of the reflectance can be achieved for a wavelength of 1064 nm.

Each of the semiconductor laser units 18a and 18b is structured by a semiconductor laser array having an aperture of 10 millimeters. Each of the semiconductor laser array emits the excitation laser beam of 15 watts which has a wavelength of 807 nm when energized by a drive current of 25 amperes.

In the illustrated example, the semiconductor laser units 18a and 18b are mounted on the thermal conductive support 21 together with the solid-state laser medium 10. The thermal conductive support 21 is similar to that illustrated in FIG. 2 and may be called a thermal conductive substrate. On the thermal conductive support 21, first and second mirrors 16a and 17 are arranged together with photo detector 31 and the optical function element which may be a Q switch element as described in conjunction with FIG. 2. The first mirror 16a is remote from the solid-state laser medium 10 and is similar to the second mirror 17.

In this connection, the first mirror 16a comprises a concave lens having a concave surface directed to the solid-state laser medium 10 and a dielectric multi-layer as will be mentioned later.

Like in FIG. 3, the solid-state laser medium 10 generates the oscillation laser beam L1 which has the wavelength equal to 1064 nm. The dielectric multi-layer of the first mirror 16a has a reflectance not smaller than 99.9% for the oscillation laser beam L1 and a radius of curvature equal to 500 millimeters. On the other hand, the second mirror 17 has a reflectance of 95% for the oscillation laser beam L1 and a radius of curvature equal to 500 millimeters. A distance between the first and the second mirrors 16a and 17 is equal to 50 millimeters in this example.

In addition, the Q switch element 12 is located between the solid-state laser medium 10 and the second mirror 17. At any rate, the above-mentioned optical elements, such as the solid-state laser medium 10, the first and the second mirrors 16a and 17, the Q switch element 12, and the photo detector 31 are arranged on the thermal conductive substrate 21 so that they have a common optical axis.

The thermal conductive substrate 21 is housed in and brought into contact with an adiabatic housing 22b along with the optical elements. The illustrated adiabatic housing 22b has an outlet aperture at an end located along the optical axis and a bottom opening 26 formed on a bottom of the housing 22b, like in FIG. 2. In the bottom opening 26, a thermal control block 27 of, for example, a Peltier effect element is packed to thermally connect the thermal conductive substrate 21 to a heat sink 23b which has a plurality of fins on an external surface thereof.

With this structure, when the solid-state laser medium 10 is pumped by the semiconductor laser units 18a and 18b and the Q switch is repeatedly turned on, the oscillation laser beam L1 is emitted from the solid-state laser medium 10 and is generated through the second mirror 17 as the output laser beam depicted at L1 in FIG. 4. The oscillation laser beam L1 has a repetition frequency of 1 kHz, a pulse width of 30 ns, average output power of 300 milliwatts, and pulse energy of 300 micro joules. The oscillation laser beam L1 partially leaks through the first mirror 16a and is incident on the photo detector 31. The photo detector 31 supplies the excitation laser beam controller 32 with the photo detection signal corresponding to the intensity of the oscillation laser beam L1. The excitation laser beam controller 32 delivers the control signal as the drive signal to the semiconductor laser units 18a and 18b like in FIGS. 2 and 3. Thus, the intensity of the output laser beam L2 is stabilized by controlling the intensity of the excitation laser beam by the use of a feedback technique.

Incidentally, the current limiter 33 is set so that a maximum current of each semiconductor laser array is rendered into 26 amperes.

According to the illustrated device, it has been confirmed that a similar stability to the other embodiments can be accomplished as a result of a laser oscillation experiment.

Even when the optical function element 12 has been removed from each device, it has been possible to keep stability of the output laser beam like in FIGS. 2 through 5.

While this invention has thus far been described in conjunction with a few embodiments thereof, it will readily be possible for those skilled in the art to put this invention in various other manners. For example, the solid-state laser medium 10 may be of, for example, Nd:YLF, Nd:glass, Nd:YVO4, Nd:GGG, Nd:YSGG, NAB, NPP, LNP, Er:YAG, Er:YLF, Er:glass, or the like, instead of Nd:YAG. In this case, oscillation conditions should be determined at each laser medium. The Q switch element may be, for example, an EO (electro-optic) Q switch element or an AO (acousto-optic) Q switch which is formed by quartz glass, flint glass, $SiO_2$, $TeO_2$ $LiNbO_3$, $PbMoO_4$, or the like. The wavelength conversion element may be selected from a group of $KNbO_3$, $LiNbO_3$, BBO, LBO, and so on and may be combined with a half wavelength plate or a quarter wavelength plate to oscillate a green or a blue laser beam which is different from the oscillation laser beam. In addition, the optical function element may be located outside of the laser resonator, although the description has been restricted to the optical function element placed within the laser resonator. Though the control signal is supplied from the excitation laser beam controller 32 to the semiconductor laser unit 18 in the above embodiments, the control signal may be sent to a filter element which is located between the semiconductor laser unit 18 and the solid-state laser device 10 and which varies a transmittance in response to the control signal. In this event, the intensity of the excitation laser beam is kept invariable.

What is claimed is:

1. A solid-state laser device for use in emitting an output laser beam by pumping a solid-state laser medium in a laser resonator by an excitation laser beam generated from a semiconductor laser unit, said solid-state laser device comprising:

photo detection means for detecting intensity of said output laser beam to produce a photo detection signal representative of said intensity of the output laser beam; and control means coupled to said photo detection means for controlling said excitation laser beam so that said output laser beam becomes substantially invariable in intensity.

2. A solid-state laser device as claimed in claim 1, said laser resonator generating a resonator output beam, wherein said photo detection means comprises:

a beam splitter responsive to said resonator output beam for splitting said resonator output beam into said output laser beam and a detection laser beam which has intensity substantially proportional to that of said output laser beam; and a photo detector responsive to said detection laser beam for detecting the intensity of said detection laser beam to supply said photo detection signal to said control means.

3. A solid-state laser device as claimed in claim 1, said laser resonator having a first mirror substantially transparent to said excitation laser beam and a second mirror which is opposite to said first mirror with a spacing left therebetween and which reflects an incident laser beam thereon with a partial laser beam passing through said second mirror as said output laser beam, wherein said photo detection means comprises:

a photo detector placed outside of said laser resonator so that said output laser beam is incident onto said photo detector.

4. A solid-state laser device for use in emitting an output laser beam by pumping a solid-state laser medium in a laser resonator by an excitation laser beam generated from a semiconductor laser unit placed outside of said laser resonator, said output laser beam partially passing through said laser resonator towards said semiconductor laser unit as a leak laser beam which has intensity substantially proportional to that of said output laser beam, said semiconductor laser unit comprising:

a semiconductor laser for generating said excitation laser beam; and photo detection means united with said semiconductor laser for detecting intensity of said leak laser beam to produce a photo detection signal representative of said intensity of the leak laser beam;

said solid-state laser device further comprising:

control means coupled to said photo detection means for controlling said excitation laser beam so that said output laser beam becomes substantially invariable in intensity.

5. A solid-state laser device for use in emitting an output laser beam by pumping a solid-state laser medium in a laser resonator by an excitation laser beam generated from a semiconductor laser unit on said solid-state medium, said solid-state laser medium having a pair of end surfaces opposite to each other and a side surface contiguous to said end surfaces, said excitation laser beam being irradiated onto said side surface of the solid-state laser medium, resonator, said output laser beam passing through said laser resonator towards said semiconductor laser unit as an additional laser beam which has intensity substantially proportional to that of said output laser beam, said semiconductor laser unit comprising:

a semiconductor laser for generating said excitation laser beam;

photo detection means for detecting intensity of said laser beam to produce a photo detection signal representative of said intensity of the additional laser beam;

said solid-state laser device further comprising:

control means coupled to said photo detection means for controlling said semiconductor laser medium so that said output laser beam becomes substantially invariable in intensity.

6. A solid-state laser device as claimed in claim 1, further comprising:

a thermal conductive substrate on which said solid-state laser medium and said laser resonator are mounted; and thermal control means coupled to said photo detection means and said thermal conductive substrate for controlling said thermal conductive substrate in response to said photo detection signal so that the intensity of said output laser beam is varied by a temperature of the thermal conductive substrate.

7. A solid-state laser device as claimed in claim 1, further comprising:

an optical element which has a predetermined optical characteristic and which is located at a position related to said laser resonator.

8. A solid-state laser device as claimed in claim 7, wherein said position is placed inside of said laser resonator.

9. A solid-state laser device as claimed in claim 7, wherein said position is placed outside of said laser resonator.

* * * * *